(12) United States Patent
Uchiyama

(10) Patent No.: US 7,044,536 B2
(45) Date of Patent: May 16, 2006

(54) COUPLING STRUCTURE OF HOOD LOCK STAY

(75) Inventor: Tatsuhiko Uchiyama, Nakano-ku (JP)

(73) Assignee: Calsonic Kansei Corporation, Tokyo (JP)

( * ) Notice: Subject to any disclaimer, the term of this patent is extended or adjusted under 35 U.S.C. 154(b) by 89 days.

(21) Appl. No.: 10/774,384

(22) Filed: Feb. 10, 2004

(65) Prior Publication Data

US 2004/0155486 A1 Aug. 12, 2004

(30) Foreign Application Priority Data

Feb. 10, 2003 (JP) ............... 2003-032842

(51) Int. Cl.
*B62D 25/08* (2006.01)

(52) U.S. Cl. ............... 296/203.02; 296/187.09; 296/193.11

(58) Field of Classification Search ........... 296/193.03, 296/193.09, 193.11, 203.02, 187.09
See application file for complete search history.

(56) References Cited

U.S. PATENT DOCUMENTS

| | | | | |
|---|---|---|---|---|
| 4,428,447 A | * | 1/1984 | Malen | 296/193.09 |
| 5,106,148 A | * | 4/1992 | Ikeda et al. | 296/203.02 |
| 5,271,473 A | * | 12/1993 | Ikeda et al. | 296/203.02 |
| 5,348,114 A | * | 9/1994 | Yamauchi | 296/203.02 |
| 6,170,906 B1 | * | 1/2001 | Kasuga | 296/203.02 |
| 6,502,653 B1 | * | 1/2003 | Balzer et al. | 296/203.02 |
| 6,729,424 B1 | * | 5/2004 | Joutaki et al. | 296/203.02 |
| 2004/0100127 A1 | * | 5/2004 | Saitou | 296/203.02 |
| 2004/0160088 A1 | * | 8/2004 | Staargaard et al. | 296/193.09 |

FOREIGN PATENT DOCUMENTS

| | | |
|---|---|---|
| EP | 1213207 A1 | 6/2002 |
| GB | 2274626 | 8/1994 |
| JP | 9-36897 | 2/1997 |
| JP | 2002-120760 | 4/2002 |

* cited by examiner

*Primary Examiner*—Lori L. Coletta
(74) *Attorney, Agent, or Firm*—Wenderoth, Lind & Ponack, L.L.P.

(57) ABSTRACT

A hood lock stay couples, in the vertical direction of a vehicle, center portions of a radiator core support upper member and a radiator core support lower member, respectively extending in the transverse direction of the motor vehicle. The hood lock stay secures a hood lock to the upper portion thereof. The radiator core support upper member is formed to have an open cross-sectional shape provided with at least a wall portion. The upper portion of the hood lock stay is disposed so as to cover the opening of the opened cross-section of the radiator core support upper member so that a box shape is formed. In this state of forming the box shape, these two are coupled.

14 Claims, 3 Drawing Sheets

COUPLING STRUCTURE OF HOOD LOCK STAY

BACKGROUND OF THE INVENTION

1. Field of the Invention

The present invention relates to a coupling structure of a hood lock stay which couples center portions of a radiator core support upper member and a radiator core support lower member of a radiator core support of a motor vehicle such as an automobile, the hood lock stay securing a hood lock to the upper portion thereof.

2. Description of the Related Art

A conventional radiator core support for an automobile is disclosed for example in Japanese Patent Laid-Open No. Tokkai 2002-120760. This radiator core support is mainly composed of a radiator core support upper member extending in a transverse direction of the automobile and a radiator core support lower member running parallel thereto under the same. A radiator core support side member couples the right and left ends of the radiator core support upper member and those of the radiator core support lower member with each other. A hood lock stay couples each center portion of the radiator core support upper member and the radiator core support lower member with each other.

However, in the radiator core support in the prior art, the upper portion of the hood lock stay and the radiator core support upper member are secured to each other with their surfaces being appressed to each other. Therefore, stiffness shows a tendency to lower around the coupled part of the radiator core support upper member with the hood lock stay. As a result, at the time, for example, of a safety inspection of a motor vehicle, when an inspector put his/her hand on the radiator core support upper member with his/her weight thereon, the lack of stiffness is a problem.

Further, with the hood lock stay of lower stiffness, it is impossible to secure the hood lock in a stable manner, so that there is a probability of causing a flip-flop of an engine hood and of lowering sound vibration performance while driving.

SUMMARY OF THE INVENTION

The present invention is made by focusing on the previously-mentioned problems. An object of the present invention is to provide a coupling structure of a hood lock stay capable of improving stiffness around a coupled part of a radiator core support upper member with a hood lock stay, and capable of realizing stable securing of the hood lock.

The coupling structure of the hood lock stay of the present invention is composed of a radiator core support upper member extending in a transverse direction of a motor vehicle, a radiator core support lower member extending under the radiator core support upper member in the transverse direction of the vehicle, and a hood lock stay which is coupled in a vertical direction of the vehicle with almost center portions of the radiator core support upper member and the radiator core support lower member. The hood lock stay secures a hood lock to an upper portion thereof. The radiator core support upper member is formed to have at least an open cross-sectional shape provided with a wall portion, and the radiator core support upper member and the hood lock stay are coupled with each other in a state in which they form a box shape by disposing an upper portion of the hood lock stay so as to cover an opening of the opened cross-section of the radiator core support upper member.

In the above-described coupling structure of the hood lock stay, the radiator core support upper member and the hood lock stay are coupled with each other in the state forming the box shape by themselves.

Consequently, this box shape improves the stiffness around the coupled part of the radiator core support upper member with the hood lock stay, allowing, as a result, improvements in stiffness to a level ensuring sufficient stiffness to resist an inspector's weight at the time, for example, of a safety inspection of the radiator core support upper member of the motor vehicle, in engine hood fastening performance, and in sound vibration performance.

Preferably, the hood lock stay is formed in the upper portion thereof with a recessed portion which is recessed in a front-to-rear direction of the motor vehicle. With a wall portion of the recessed portion, the opening of the radiator core support upper member is covered to form the box shape.

In order to form the box shape, what are used are the recessed portion formed by recessing the upper portion of the hood lock stay in the front-to-rear direction and the reverse surface of the radiator core support upper member so that the stiffness of the upper portion of the hood lock stay can be improved and no additional parts for forming the box shape are required.

Preferably, the recessed portion is formed essentially over all of the vertical length of the hood lock stay.

Since the recessed portion is formed essentially over all of the vertical length of the hood lock stay, the entire stiffness of the hood lock stay can be improved to thereby further serve to improve the entire stiffness of the radiator core support.

Preferably, the wall portion of the radiator core support upper member is composed at least of an upper wall portion having an almost horizontal surface and a vertical wall portion adjoining the upper wall portion and extending in the transverse and vertical direction of the vehicle.

Consequently, the upper portion of the hood lock stay is in the state supporting the upper wall portion of the radiator core support upper member, so that the stiffness of the radiator core support upper member, particularly that in the vertical direction of the vehicle, can be enhanced.

BRIEF DESCRIPTION OF THE DRAWINGS

The objects, features, and advantages of the present invention will become apparent as the description proceeds when taken in conjunction with the accompanying drawings, in which.

DETAILED DESCRIPTION OF THE PREFERRED EMBODIMENT

Hereinafter, an embodiment of the present invention will be described based on the drawings.

Figure 1:
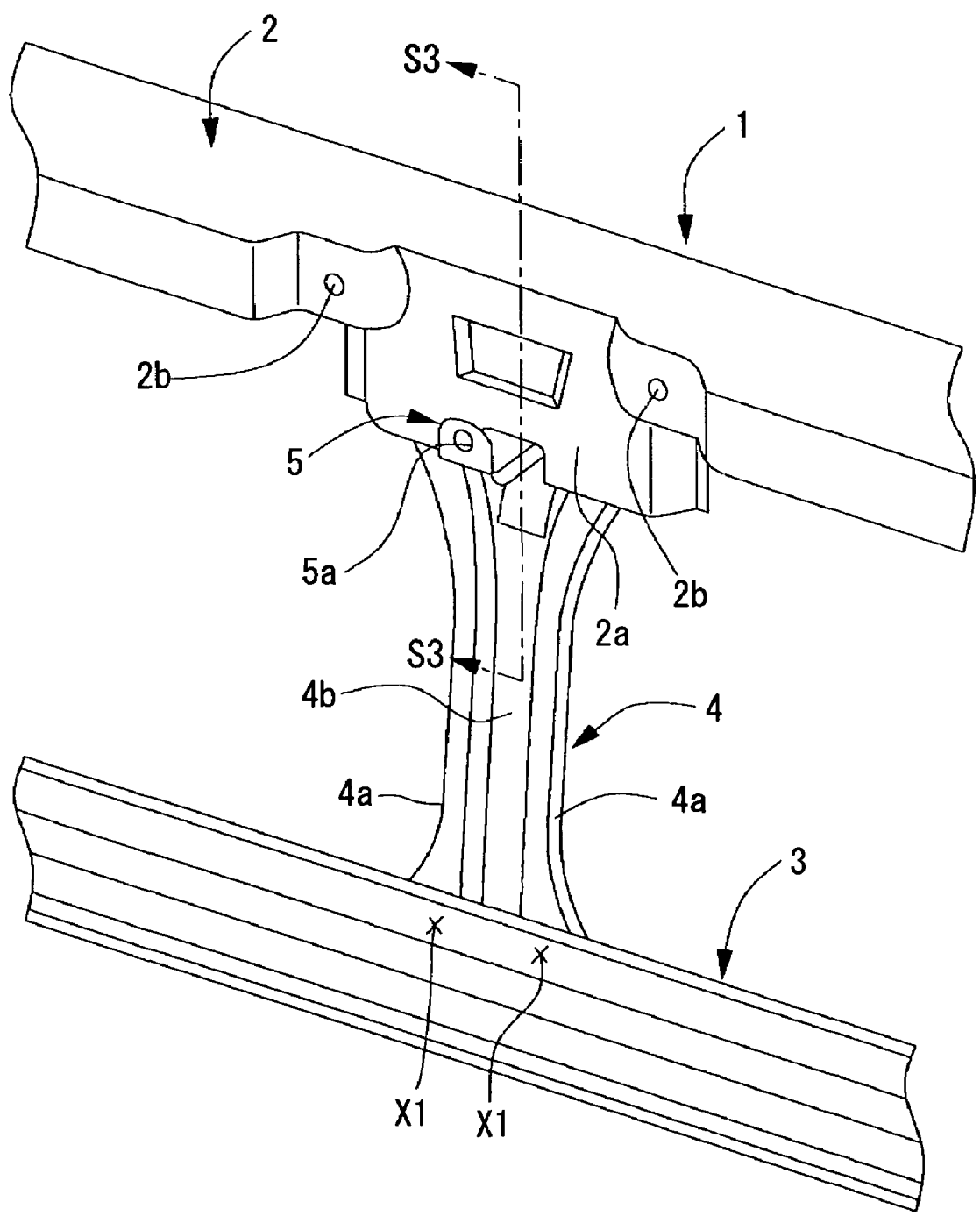
FIG. 1 is a perspective front view showing a hood lock stay of an embodiment according to the present invention.
Figure 2:
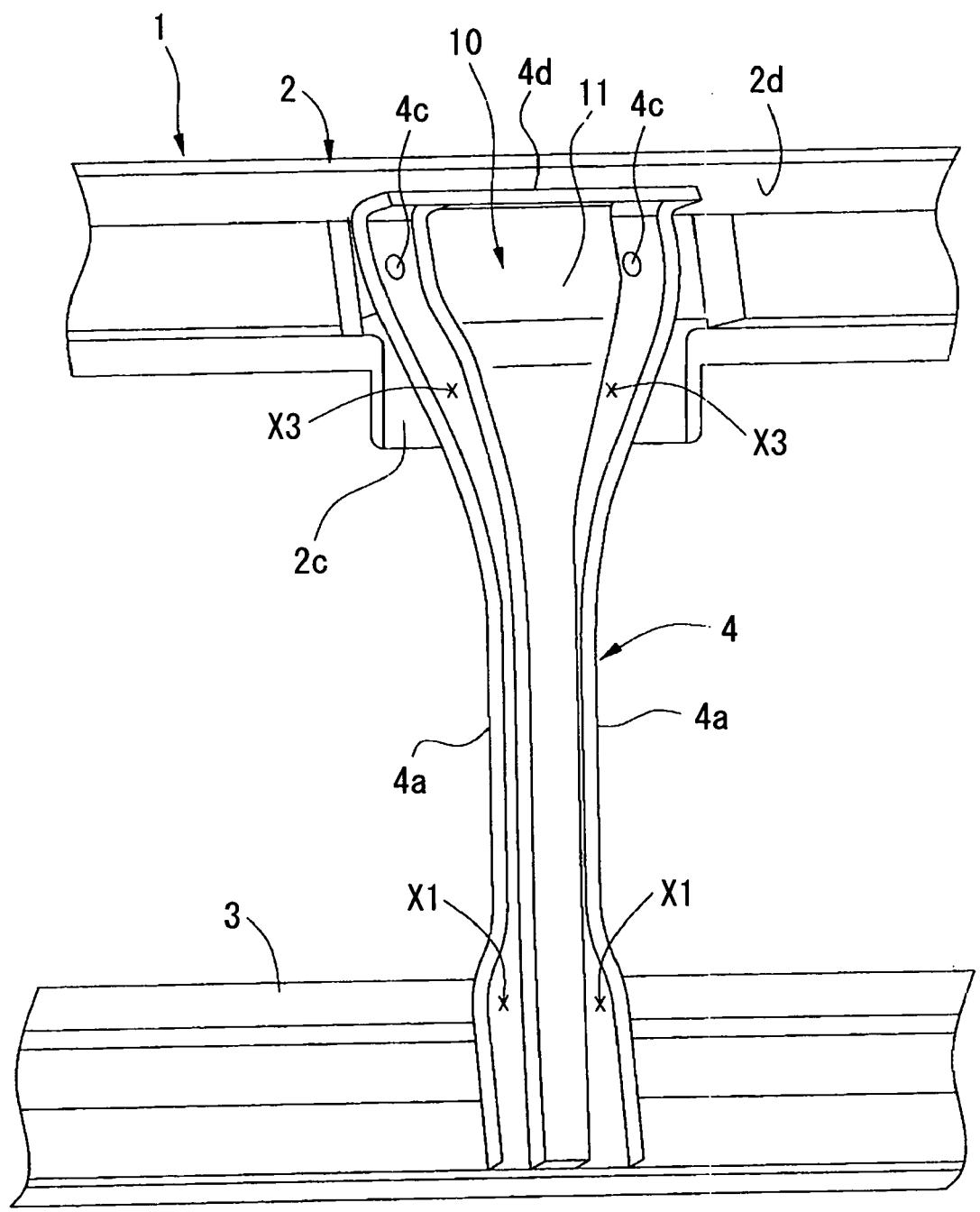
FIG. 2 is a perspective rear view showing the hood lock stay of FIG. 1 according to the embodiment.

As shown in FIG. 1 and FIG. 2, in the coupling structure of the hood lock stay according to the embodiment of the present invention, a radiator core support 1 is composed of a radiator core support upper member 2 and a radiator core support lower member 3 extending in the transverse direction of a motor vehicle at upper and the lower positions, respectively, and a hood lock stay 4 extending in the vertical direction while being coupled with center portions of the radiator core support upper member 2 and the radiator core support lower member 3. These three components, the radiator core support 1, the radiator core support upper member 2, and the radiator core support lower member 3 are all made of metal.

Further, the radiator core support upper member 2 is formed to have a U-shaped cross-section opening rearward. A center portion 2a located at the center of the radiator core support upper member 2 is formed to fit in the shape of a hood lock 6. It is provided by extending the bottom end of the front surface side of the radiator core support upper member 2 toward the lower side.

Furthermore, in left and right positions adjacent to the center portion 2a, there are formed bolt through holes 2b, 2b as described below.

The radiator core support lower member 3 is formed to have the U-shaped cross-section opening rearward and is welded and secured by spot welding to the two places X1, X1 at the right and left of the lower portion of the hood lock stay 4.

At the right and left ends of the hood lock stay 4, there are provided flange portions 4a, 4a bent toward the rearward side. Also, at the center of the hood lock stay 4, a recessed portion 4b, recessed toward the rearward side, is formed essentially over all of the vertical length of the hood lock stay 4.

Figure 3:
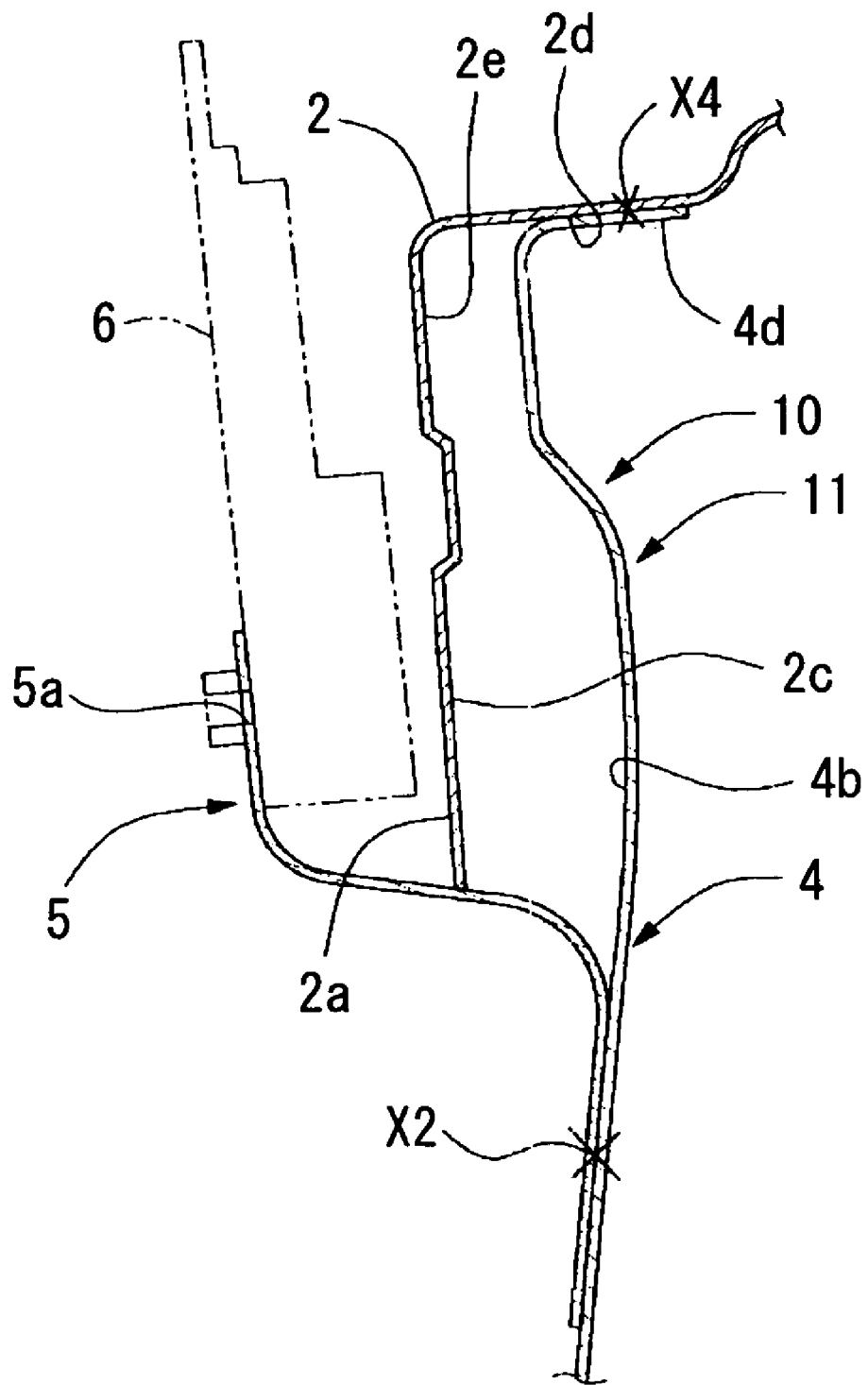
FIG. 3 is a cross-sectional side view, taken along line S3—S3 in FIG. 1, of a top end portion of the hood lock stay.

As shown in FIG. 3, further, the recessed portion 4b has a hood lock plate 5 welded and secured by spot welding at two places X2, X2 on the lower right and left portions of the same. The hood lock plate 5 has a bolt through hole 5a.

As shown in FIG. 1 and FIG. 2, the hood lock stay 4 is formed to have an upper portion 10 that is curved and expands gradually in the horizontal direction upward from almost a vertical midpoint thereof.

The upper portion 10 of the hood lock stay 4 is welded and secured by spot welding at two places X3, X3, as shown in FIG. 2, to a reverse surface 2c of the center portion 2a of the radiator core support upper member 2.

Also, in the upper portion 10 of the hood lock stay 4, there are formed relief holes 4c, 4c for a fixed bolt, not shown, for bolting a hood lock 6.

As shown in FIG. 3, the edge of the upper portion 10 of the hood lock stay 4 is bent rearward to form an L-shape so as to have a flat portion 4d. This is welded and secured by spot welding at two places X4, X4 to the right and left on the upper wall portion 2d, which continues from a vertical wall portion 2e on the reverse surface 2c of the radiator core support upper member 2.

Accordingly, as shown in FIG. 3, the upper wall portion 2d of the radiator core support upper member 2 is secured to the flat portion 4d of the hood lock stay 4 in a state supported by the flat portion 4d so that the stiffness in the vertical direction of the radiator core support upper member 2 is enhanced.

Additionally, as shown in FIG. 3, a box shape 11 is formed by the vertical wall 2e on the reverse surface 2c of the radiator core support upper member 2, including the center portion 2a, and the recessed portion 4b of the upper portion 10 of the hood lock stay 4. As a result, it is designed so that high stiffness is ensured around the part of the radiator core support upper member 2 coupled with the hood lock stay 4.

Note that it is not required to form a complete closed space inside the box shape 11, and a space such as a partly opened space may be formed therein to the extent that high stiffness is ensured.

Also, as shown in FIG. 1 to FIG. 3, the hood lock 6 is secured by being coupled at three places in total, namely to the bolt through hole 5a of the hood lock plate 5 and to the two bolt through holes 2b, 2b of the radiator core support upper member 2, by inserting bolts therethrough from the front side.

Consequently, in the coupling structure of the hood lock stay of the present embodiment, the reverse surface 2c of the radiator core support upper member 2, including the center portion 2a, and the upper portion 10 of the hood lock stay 4 form the box shape 11 to thereby improve the stiffness around the coupled part of the radiator core support upper member 2 with the upper portion 10 of the hood lock stay 4. As a result, improvement in stiffness can be made sufficient to ensure enough stiffness even when an inspector puts his/her hand on the radiator core support upper member 2 with his/her weight thereon at the time, for example, a safety inspection of the radiator core support upper member of the motor vehicle.

Further, since the hood lock 6 is secured to three places in total, namely to the radiator core support upper member 2 and the hood lock plate 5, the hood lock 6 can be stably secured, thereby enabling improvement in engine hood fastening performance and sound vibration performance.

While a preferred embodiment of the present invention has been described hereinbefore, it is to be understood that the particular features of the present invention are not intended to be limited to the present embodiment, and any change in design and the like may be made therein without departing from the spirit of the invention. Such changes are also included in the scope of the present invention.

For example, the materials and manner of securing the radiator core support upper member 2, the radiator core support lower member 3, and the hood lock stay 4 of the present embodiment may be set appropriately.

Moreover, the welding place and the number of the spot welding at the places X1 to X4 may be set appropriately.

Additionally, as a fastener other than spot welding at places X1 to X4, a bolt or a nut may be used.

What is claimed is:

1. A coupling structure of a hood lock stay, comprising:
 a radiator core support upper member extending in a transverse direction of a motor vehicle;
 a radiator core support lower member extending under said radiator core support upper member in the transverse direction of the motor vehicle; and
 a hood lock stay extending in a vertical direction of the motor vehicle and coupling almost center portions of said radiator core support upper member and said radiator core support lower member, said hood lock stay having a hood lock secured to an upper portion thereof;
 wherein said radiator core support upper member has a cross sectional shape that comprises a wall portion and that is open on at least one part thereof so as to form an opening; and
 wherein an upper portion of said hood lock stay is disposed so as to cover said opening of said open cross sectional shape of said radiator core support upper member so that said radiator core support upper member and said hood lock stay are coupled with each other so as to form a box shape in cross section.

2. The coupling structure of claim 1, wherein said hood lock stay is formed in said upper portion thereof with a recessed portion that is recessed in a front-to-rear direction of the motor vehicle, and wherein a wall portion of said recessed portion covers said opening of said radiator core support upper member to form said box shape.

3. The coupling structure of claim 2, wherein said recessed portion is formed over essentially all of the vertical length of said hood lock stay.

4. The coupling structure of claim 3, wherein:
said wall portion of said radiator core support upper member comprises at least an upper wall portion having an almost horizontal surface and a vertical wall portion adjoining said upper wall portion and extending in the transverse and vertical direction of the motor vehicle; and
a vertical upper end of said upper portion of said hood lock stay is bent so as to have an L-shape so that a flat portion having a horizontal surface is formed, said flat portion being coupled with said upper wall portion of said radiator core support upper member.

5. The coupling structure of claim 2, wherein:
said wall portion of said radiator core support upper member comprises at least an upper wall portion having an almost horizontal surface and a vertical wall portion adjoining said upper wall portion and extending in the transverse and vertical direction of the motor vehicle; and
a vertical upper end of said upper portion of said hood lock stay is bent so as to have an L-shape so that a flat portion having a horizontal surface is formed, said flat portion being coupled with said upper wall portion of said radiator core support upper member.

6. The coupling structure of claim 1, wherein:
said wall portion of said radiator core support upper member comprises at least an upper wall portion having an almost horizontal surface and a vertical wall portion adjoining said upper wall portion and extending in the transverse and vertical direction of the motor vehicle; and
a vertical upper end of said upper portion of said hood lock stay is bent so as to have an L-shape so that a flat portion having a horizontal surface is formed, said flat portion being coupled with said upper wall portion of said radiator core support upper member.

7. The coupling structure of claim 1, wherein said box shape is longer in the vertical direction than in the horizontal direction.

8. A coupling structure of a hood lock stay, comprising:
a radiator core support upper member extending in a transverse direction of a motor vehicle;
a radiator core support lower member extending under said radiator core support upper member in the transverse direction of the motor vehicle; and
a hood lock stay extending in a vertical direction of the motor vehicle and coupling central portions of said radiator core support upper member and said radiator core support lower member, said hood lock stay having a hood lock secured to an upper portion thereof;
wherein said radiator core support upper member has a cross sectional shape that comprises a wall portion and that is open on at least one part thereof so as to form an opening; and
wherein an upper portion of said hood lock stay is disposed so as to cover said opening of said open cross sectional shape of said radiator core support upper member so that said radiator core support upper member and said hood lock stay are coupled with each other so as to form a multi-wall shape having an at least partly enclosed interior space in cross section.

9. The coupling structure of claim 8, wherein said hood lock stay is formed in said upper portion thereof with a recessed portion that is recessed in a front-to-rear direction of the motor vehicle, and wherein a wall portion of said recessed portion covers said opening of said radiator core support upper member to form said multi-wall shape.

10. The coupling structure of claim 9, wherein said recessed portion is formed over essentially all of the vertical length of said hood lock stay.

11. The coupling structure of claim 10, wherein:
said wall portion of said radiator core support upper member comprises at least an upper wall portion having an almost horizontal surface and a vertical wall portion adjoining said upper wall portion and extending in the transverse and vertical direction of the motor vehicle; and
a vertical upper end of said upper portion of said hood lock stay is bent so as to have an L-shape so that a flat portion having a horizontal surface is formed, said flat portion being coupled with said upper wall portion of said radiator core support upper member.

12. The coupling structure of claim 9, wherein:
said wall portion of said radiator core support upper member comprises at least an upper wall portion having an almost horizontal surface and a vertical wall portion adjoining said upper wall portion and extending in the transverse and vertical direction of the motor vehicle; and
a vertical upper end of said upper portion of said hood lock stay is bent so as to have an L-shape so that a flat portion having a horizontal surface is formed, said flat portion being coupled with said upper wall portion of said radiator core support upper member.

13. The coupling structure of claim 8, wherein:
said wall portion of said radiator core support upper member comprises at least an upper wall portion having an almost horizontal surface and a vertical wall portion adjoining said upper wall portion and extending in the transverse and vertical direction of the motor vehicle; and
a vertical upper end of said upper portion of said hood lock stay is bent so as to have an L-shape so that a flat portion having a horizontal surface is formed, said flat portion being coupled with said upper wall portion of said radiator core support upper member.

14. The coupling structure of claim 8, wherein said multi-wall shape is longer in the vertical direction than in the horizontal direction.

* * * * *